United States Patent
Amigo

[19]

[11] Patent Number: 5,904,029
[45] Date of Patent: May 18, 1999

[54] PROCESS FOR CONTINOUSLY FITTING MESH BAGS CONTAINING FRUIT AND VEGETABLE PRODUCTS AND THE LIKE, AND A MACHINE TO CARRY OUT THE ACTUAL PROCESS

[75] Inventor: Ezequiel Giro Amigo, Badalona, Spain

[73] Assignee: Empac, S.A. Juame Ribo, Badalona, Spain

[21] Appl. No.: 08/994,703

[22] Filed: Dec. 19, 1997

[30] Foreign Application Priority Data

Jul. 16, 1997 [ES] Spain .................................. 9701583

[51] Int. Cl.⁶ .................................................. B65B 1/22
[52] U.S. Cl. .......................... 53/437; 53/479; 53/502; 53/53; 53/467; 53/138.3; 53/138.7
[58] Field of Search .......................... 53/437, 469, 479, 53/53, 525, 436, 502, 504, 65, 138.3, 138.7, 570, 473, 467, 523, 526, 527

[56] References Cited

U.S. PATENT DOCUMENTS

| | | | |
|---|---|---|---|
| 3,731,454 | 5/1973 | Crabb | 53/138.7 |
| 3,738,077 | 6/1973 | Leach | 53/502 |
| 4,414,788 | 11/1983 | Berg | 53/436 |
| 4,617,785 | 10/1986 | Chikatani et al. | 53/570 |
| 4,644,735 | 2/1987 | Savigny | 53/570 |
| 4,700,755 | 10/1987 | Banys | 53/384.1 |
| 4,907,396 | 3/1990 | McClusky et al. | 53/437 |
| 4,928,473 | 5/1990 | Nagao et al. | 53/502 |
| 4,999,969 | 3/1991 | Holmes | 53/138.3 |
| 5,029,431 | 7/1991 | Weening et al. | 53/437 |
| 5,279,099 | 1/1994 | Goodman et al. | 53/502 |
| 5,442,898 | 8/1995 | Gabree et al. | 53/437 |
| 5,452,559 | 9/1995 | Lipes | 53/570 |
| 5,622,025 | 4/1997 | Kitagawa | 53/502 |
| 5,673,541 | 10/1997 | Arzuman et al. | 53/570 |

FOREIGN PATENT DOCUMENTS

| 2527807 | 1/1977 | Germany | 53/138.3 |
|---|---|---|---|

*Primary Examiner*—James F. Coan
*Assistant Examiner*—Gene L. Kim
*Attorney, Agent, or Firm*—Lackenbach Siegel Marzullo Aronson & Greenspaon

[57] ABSTRACT

Bags, (1) produced at generic machines (2), are removed by means (3) toward grippers (5) associated to a conveyor line consisting of endless chain sections (4)–(10), including means (8) for weighing the bags (1), and bar-code and bag dimension verifying means (48) and (28). The sections (4) and (10) are related by transfer means (9) which may or may not connect the same, depending on an order received from means (8), (48) and (28), rejecting in the latter event faulty bags or grippers without a bag, or directing them toward a fitting station (12) at which the grippers and bags are released from the chain (10), suspended at different heights and grouped in the projection of a box (16) that is lifted toward the group by a lift (17).

10 Claims, 15 Drawing Sheets

PROCESS FOR CONTINOUSLY FITTING MESH BAGS CONTAINING FRUIT AND VEGETABLE PRODUCTS AND THE LIKE, AND A MACHINE TO CARRY OUT THE ACTUAL PROCESS

DESCRIPTION

The present invention relates to a process for continuously fitting mesh bags containing fruit and vegetable products and the like, and a machine to carry out the process that, in addition to the function for which it is designed, affords a number of economic and functional advantages which are the consequence of the applicants' experience in this industrial field.

BACKGROUND OF THE INVENTION

The current state-of-the-art process consists of a worktable at which operators receive full mesh bags, produced at a conventional bagging machine, supplied by a conveyor belt, and proceed to manually fit the same within containers, that are then carried away by similarly generic conveyor means.

This process requires substantial hand labor which endears the product, and moreover suffers from other drawbacks, namely that it is almost impossible to achieve an orderly arrangement of the bags within their container in order for the labels and/or identifying elements to lie pointing in the same direction, for a good presentation to be obtained.

An automated similarly state-of-the-art process consists of a feed belt located at a height above the box that is to be filled, wherein the bags are dropped into the box whilst the latter is positioned in order for the bags to take up different places in the box, a brusque reciprocating movement then being provided in order to complete the positioning of the bags within the limits of the box.

Another known process is a bag elevator that feeds a sort of beam that positions the bags inside the box as it moves over the same. In this process, the product undergoes better treatment than in the previous one.

In both processes, however, the main drawbacks lie in that the product is treated inadequately, in that an irregular arrangement of the bags within the boxes does not allow identification of the product unless the bags are moved, since the characteristic labels are concealed beneath the product as such, and in that the bags are to a certain extent difficult to remove from inside the box, since they all lie irregularly on top of one another.

SUMMARY OF THE INVENTION

The applicants have devised a process for automatically fitting mesh bags full of product, produced at a bagging machine, the bags being of the kind including a top laminar fringe, stapled mesh bags and closed bags.

The process of the present invention comprises means for removing the bags produced at the closing machine, each of which is placed by the machine in a position to be collected by carrying grippers that travel along a conveyor line consisting of an endless chain and conveying said bags toward weight control means, at which an upward movement of the grippers discontinues their pressure on the chain conveyor, to be connected to said chain only to be driven, in order for the grippers to be positioned on said weighing point, whereupon the movement aforesaid is reversed thereby for the grippers and their bags to be once again positioned on the chain conveyor, continuing along their way.

Next, the grippers and bags access transfer means at which the grippers carrying bags of suitable weight are selected and empty grippers and grippers carrying over- or underweight bags are rejected, in order for the fitting machine to receive grippers with fill bags of suitable weight only.

The grippers with bags of suitable weight selected by the transfer means aforesaid, are positioned at the fitting point and placed within the box in a set layout using suitable means.

The process subject of the present invention yields the advantages described hereinbefore, and others that will be easily inferred from the example of an embodiment described hereinafter in further detail for an easier understanding of the characteristics set out above, and concurrently revealing several details thereof, a number of drawings being attached hereto which represent, for purely illustrative purposes and not to limit the scope of the invention, a practical embodiment thereof.

DESCRIPTION OF A PREFERRED EMBODIMENT OF THE INVENTION

Figure 8:
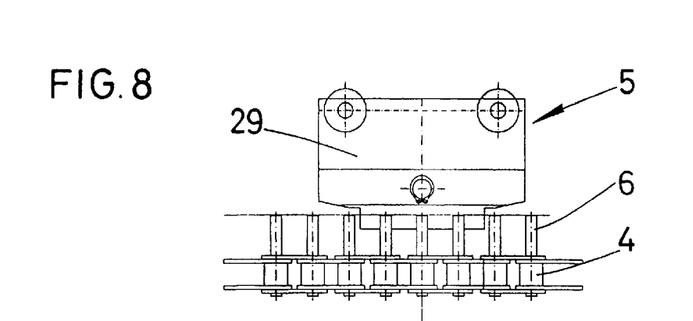
FIG. 8 is a longitudinal side elevation view of a chain conveyor portion and a top view of the carrying gripper slide in the pressure drive position.
Figure 9:
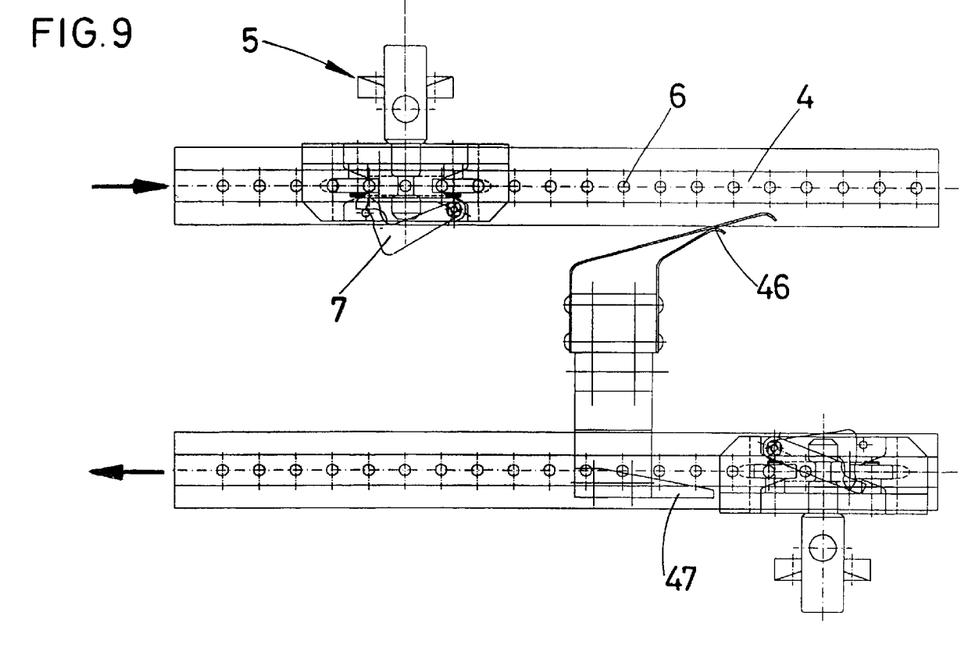
FIG. 9 is a plan view of the chain made up by two branches, namely forward and return branches; conveyor grippers; and elements for opening and closing the catch connecting the gripper and the chain, for the same to be driven by traction.

With reference to the drawings, the process involves means devised to remove the full mesh bags, designated -1-, produced at a known type of bagging machine -2-. These means, generally designated -3-, transfer the bags -1- to a first conveyor line, which consists of an endless chain -4- arranged between vertical axis pulleys -24-. The chain -4- includes and drives grippers, generally designated -5-, which collect the bags -1- previously removed by the means -3-. The chain -4- (FIGS. 8 and 9) is made up of links whose hinge pins extend upwardly into pivots -6-. These grippers -5- (FIG. 7) include first mechanical pressure driving means -22- combined with the pivots -6- which relate them to the chain -4-, allowing them to travel due to pressure, and second (mechanical traction element) means -7- (FIGS. 7 and 9) relating the grippers to the chain by traction, allowing the grippers to travel without pressing on the pivots -6- in order to enable continuous weighing of the bags under optimum conditions, with the assistance of a weighing machine, that is shown schematically at -8- and in greater detail in FIGS. 13 and 14, and further in order that it may be lifted and lowered while being conveyed at inclinations of the kind designated -44-.

Figure 13:
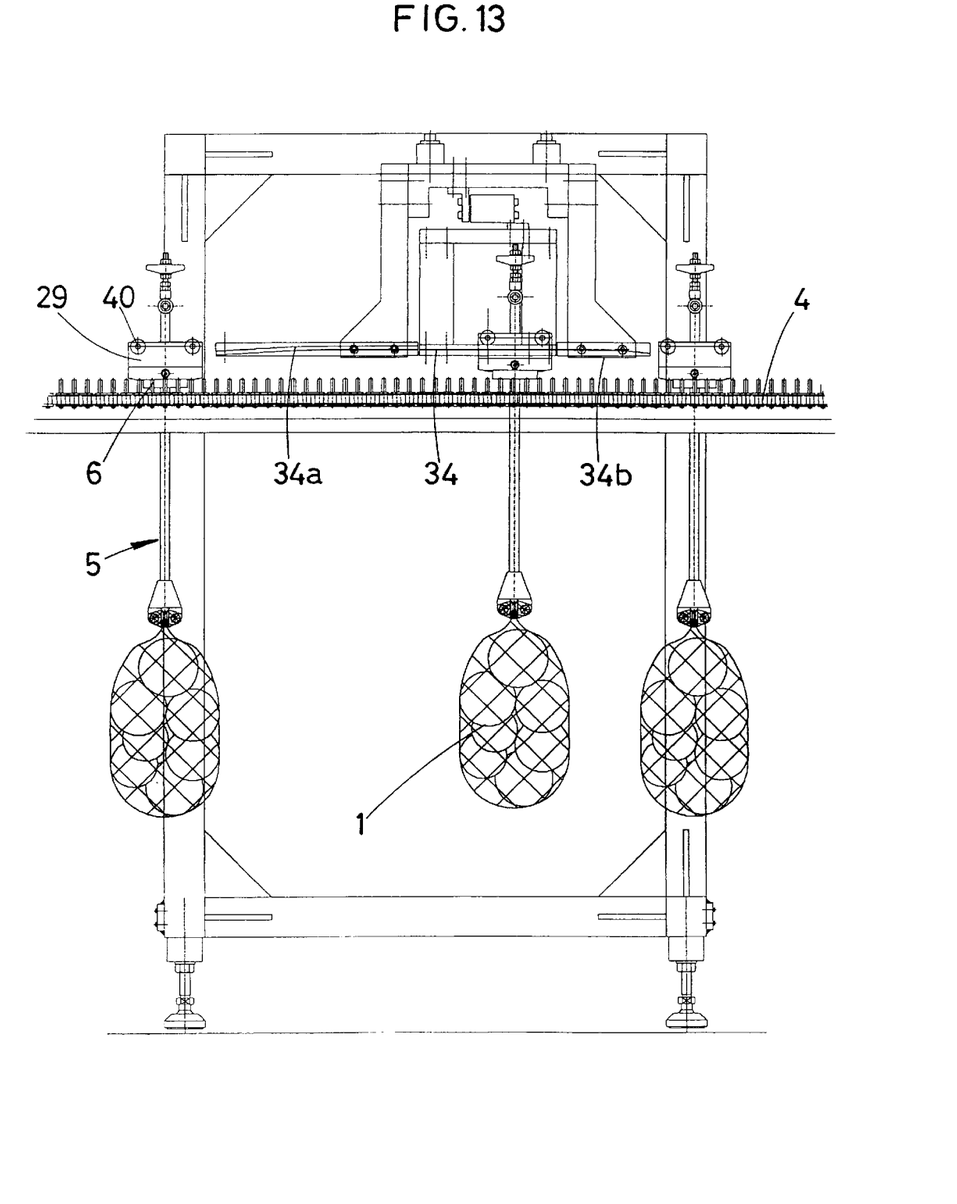
FIG. 13 is a side view of the quality and weight control.
Figure 14:
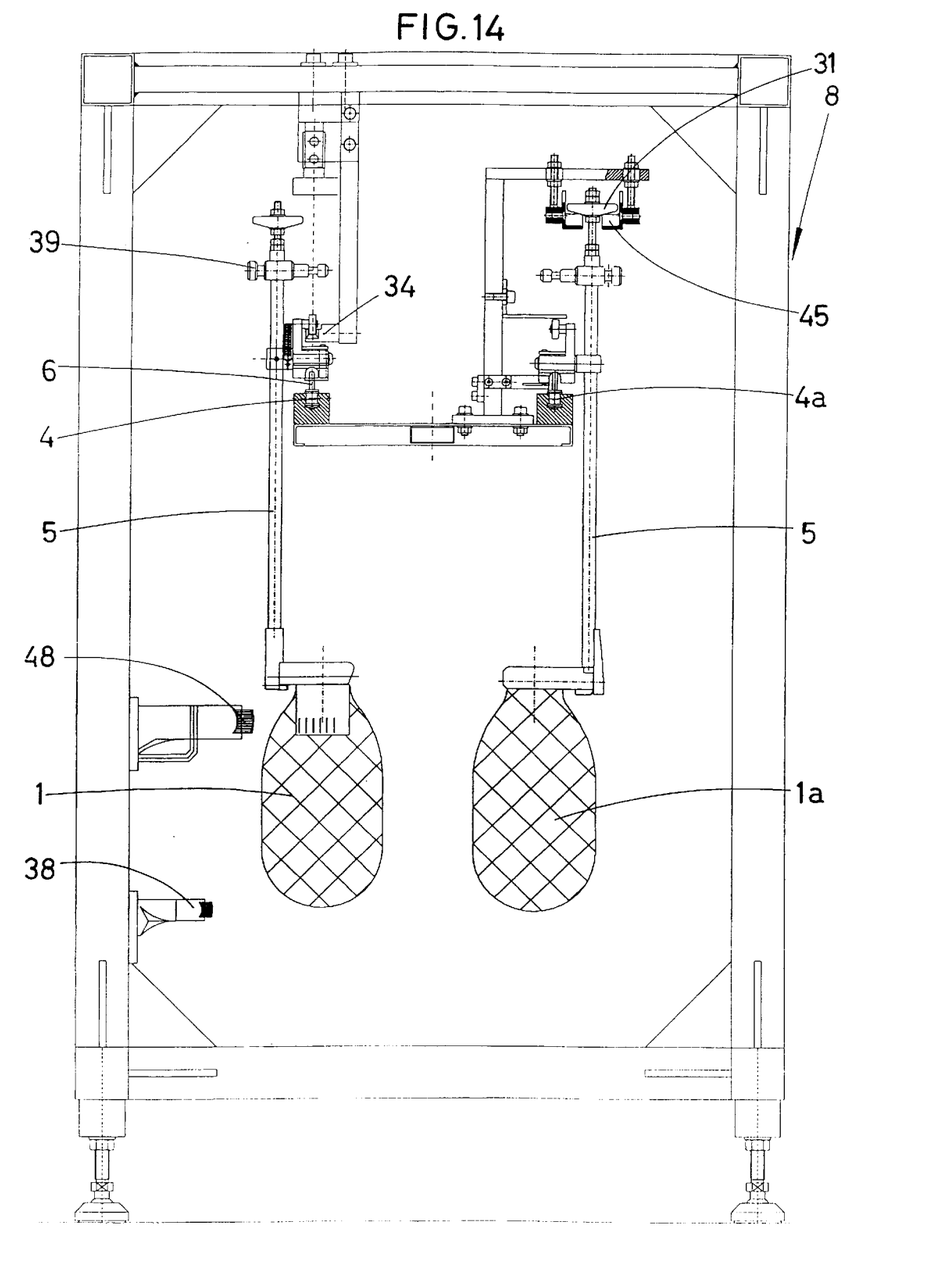
FIG. 14 is a profile view of the quality and weight control.
Figure 15:
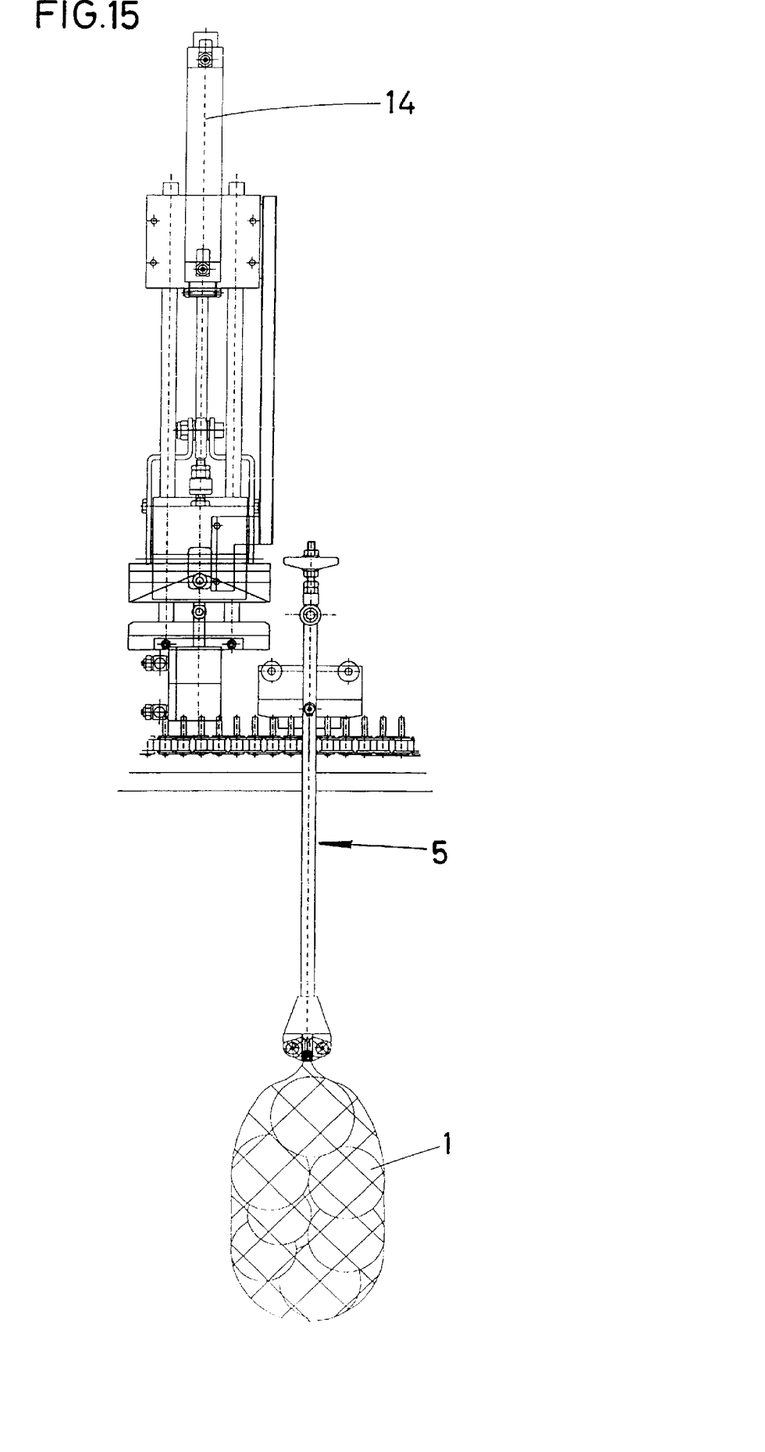
FIG. 15 is a side view of the box bag positioning element.
Figure 16:
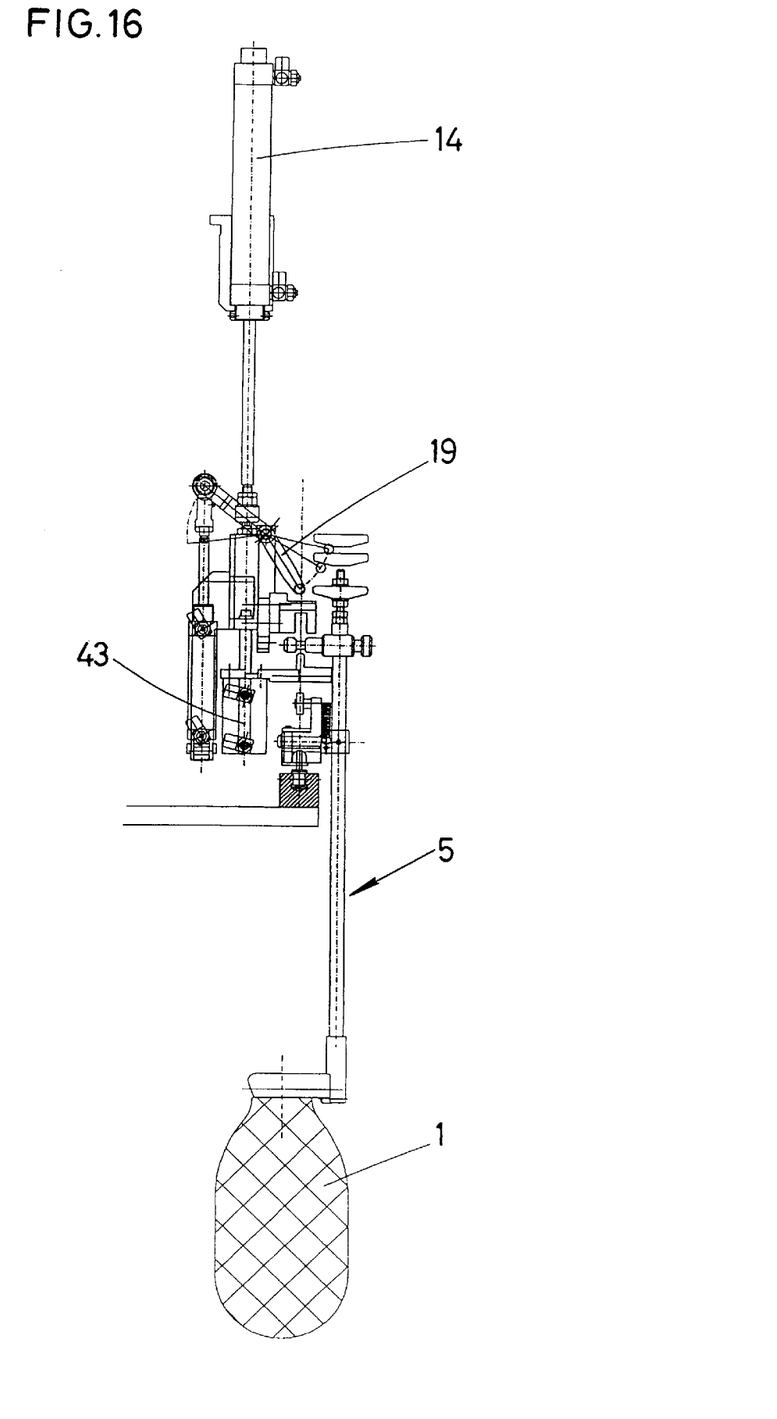
FIG. 16 is a profile view of the box bag positioning element.

The weighing machine includes a bar-code information verifier -48- and a bag dimension verifer -38-.

Figure 10:
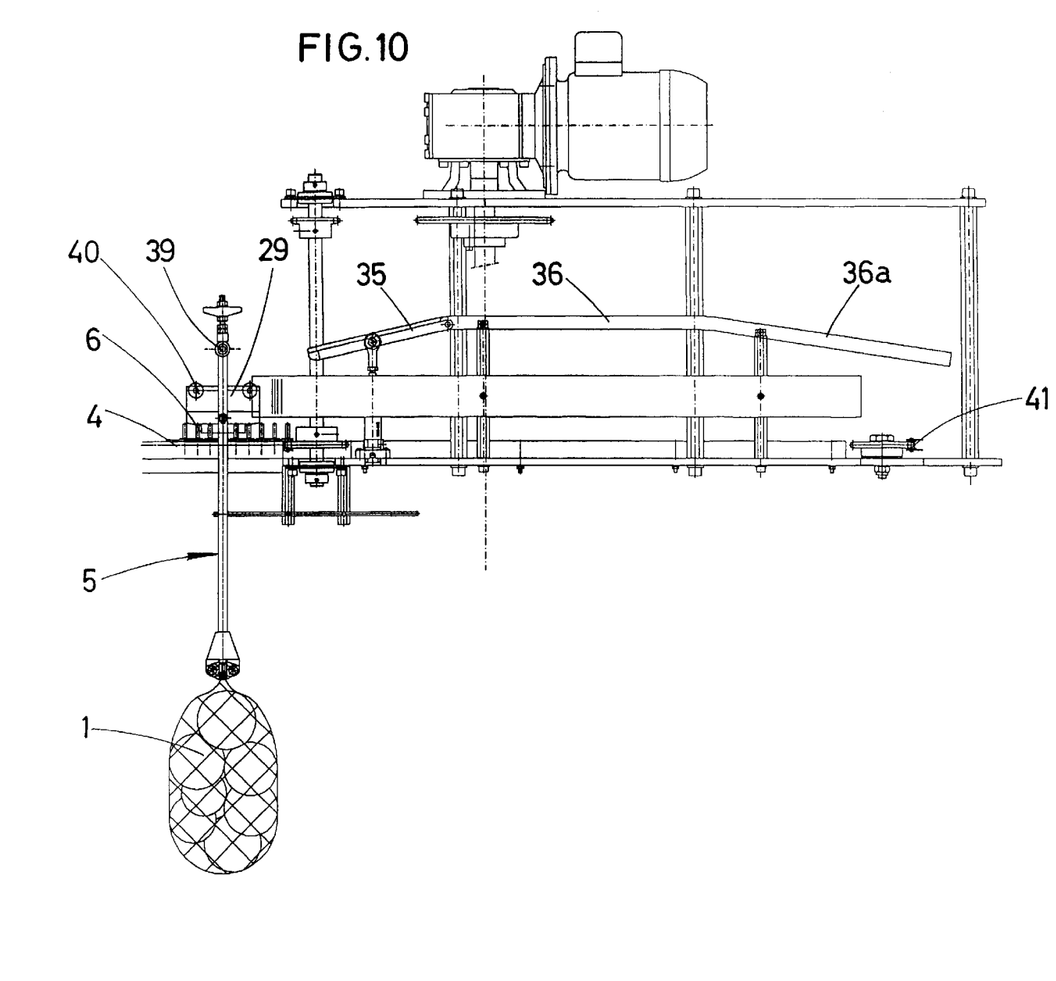
FIG. 10 is a side view of the full and empty gripper selector.
Figure 11:
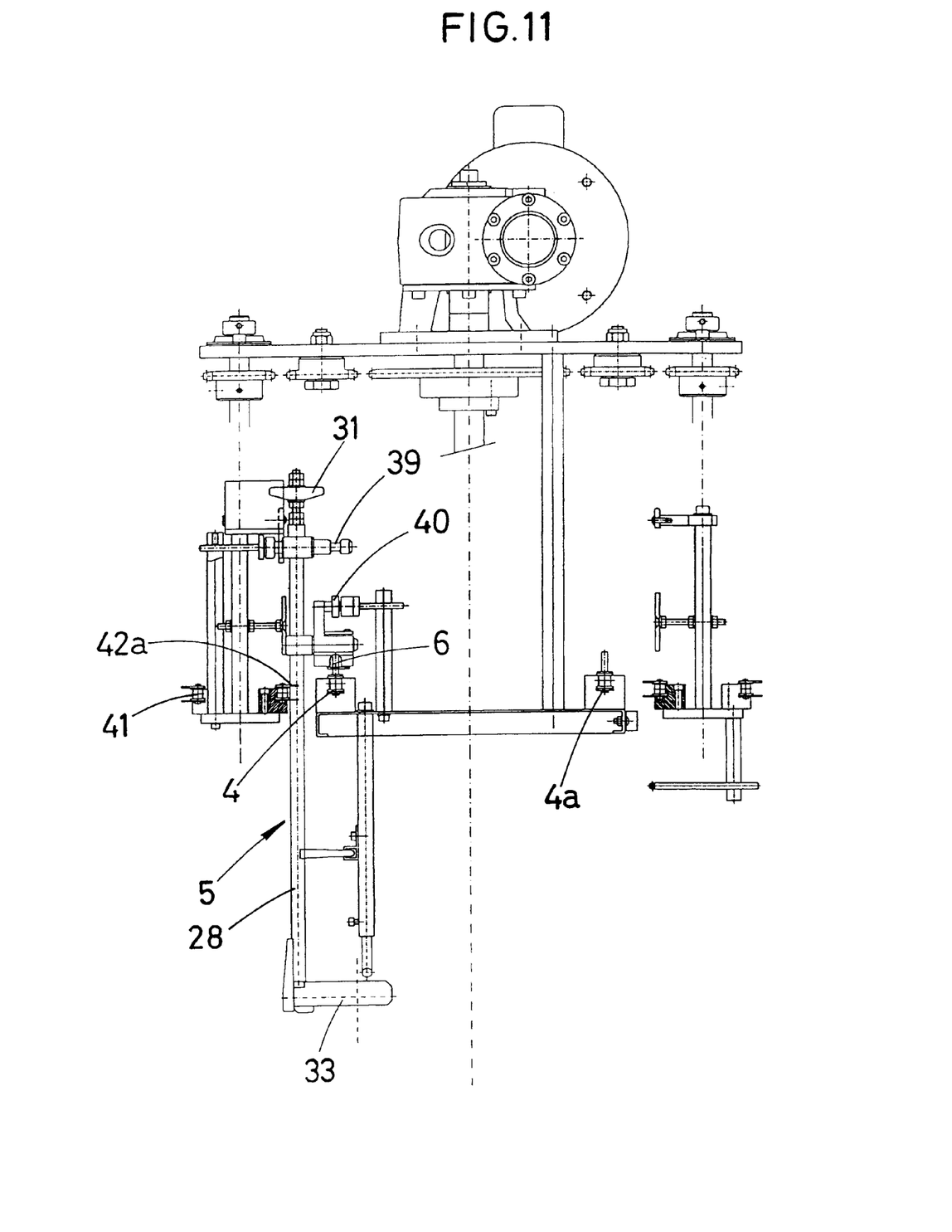
FIG. 11 is a profile view of the fill and empty gripper selector.

Transfer means, generally designated -9-, shown in greater detail in FIGS. 10 and 11, are provided at the end of the first conveyor line -4- which, depending on an order given by the weight control, establish a mechanical connection with a second conveyor line, which consists of an endless chain -10- and is likewise arranged between vertical axis pulleys -11-. These means -9- transfer the grippers -5- and their fill bags of suitable weight from the first conveyor line -4- to the second line -10-, which conveys the grippers and the bags toward a bag fitting station, generally designated -12-.

This transfer takes place by means of the gripper -5- pivot -39-.

When the order given by the weight control warns of the passage of a gripper carrying a bag of unsuitable weight or an empty gripper, the transfer means -9- provide a discontinuity isolating both conveyor lines -4- and -10-, thereby for said rejected grippers and bags -1a- or grippers without bags to be recovered through the return branch -4a- of the first conveyor line, the rejected bags are released by an element -45- which may be located at any point of the return branch -4a-. This element -45- operates at a head -31- driving the gripper -5-, causing the fingers -33- to be opened and the unsuitable bag to be released.

The fitting station -12- (FIGS. 17 and 18) has a fitting section -12a- and a pre-fitting section -12b- at which the grippers and bags are held back by a stop -13- which prevents them from moving forward toward the fitting section -12a-.

Figure 17:
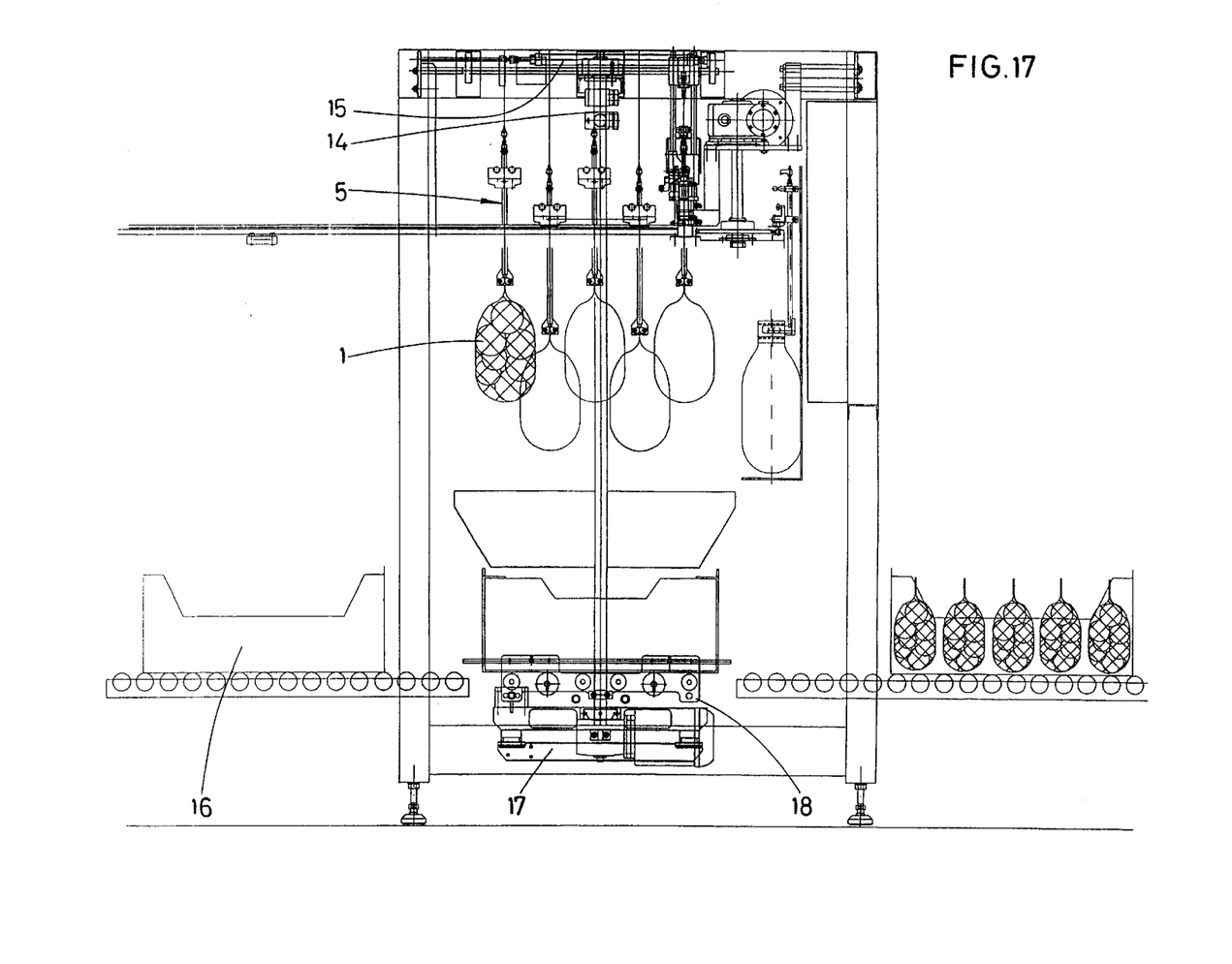
FIG. 17 is a side view of the fitter.
Figure 18:
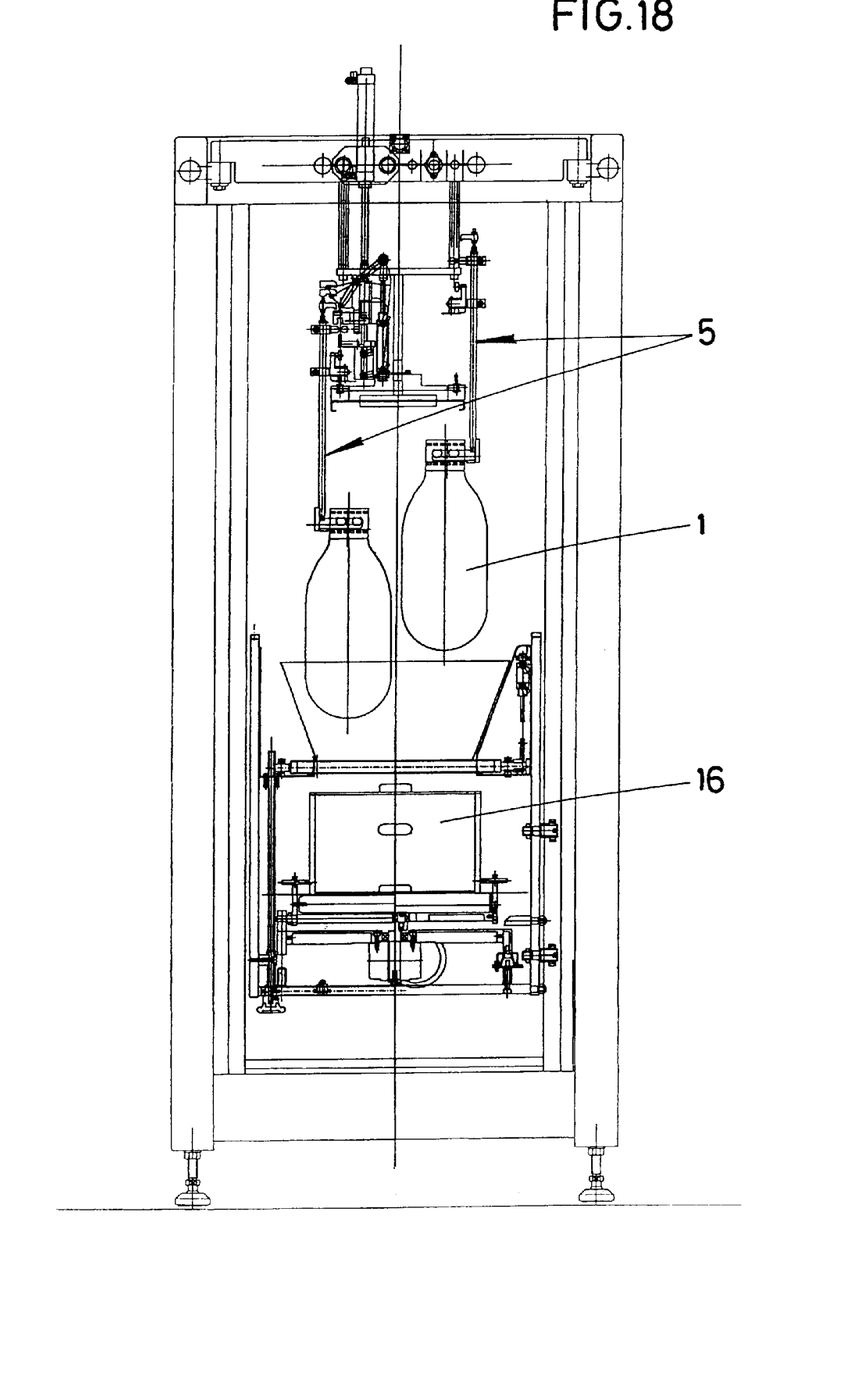
FIG. 18 is a profile view of the fitter.

At the fitting section -12a- first pneumatic cylinders -43- collect the grippers and bags, withdrawing them from the chain -4-; second pneumatic cylinders -14- suspend the grippers and bags at different heights; and third pneumatic cylinders -15- group the grippers and bags, compacting them in the vertical projection of a box -16- supplied by conventional box feeding means, the box -16- being lifted from said means by a platform-lift -17- up to a suitable height to house the group or groups of bags inside it, vibrating means -18- and means -19- releasing the bags from their respective grippers being operated, thereafter for successive operations to be carried out depending on the number of bags, and for the platform -17- to be fully lowered down to the height of the conveyor means -20- which remove the full box -16- from the fitting station.

The means -3- (FIG. 6) that remove the full mesh bags -1-, produced at the bagging machine -2-, comprise at least two clamps, generally designated -21-, located on a horizontal plane and related to a common shaft -23-, that is able to turn axially, which respectively arranges the same in a position for the bags -1- to be removed from the machine -2- and for said bags -1- to be delivered to the grippers -5- related to the first conveyor line formed by the chain -4-.

Figure 1:
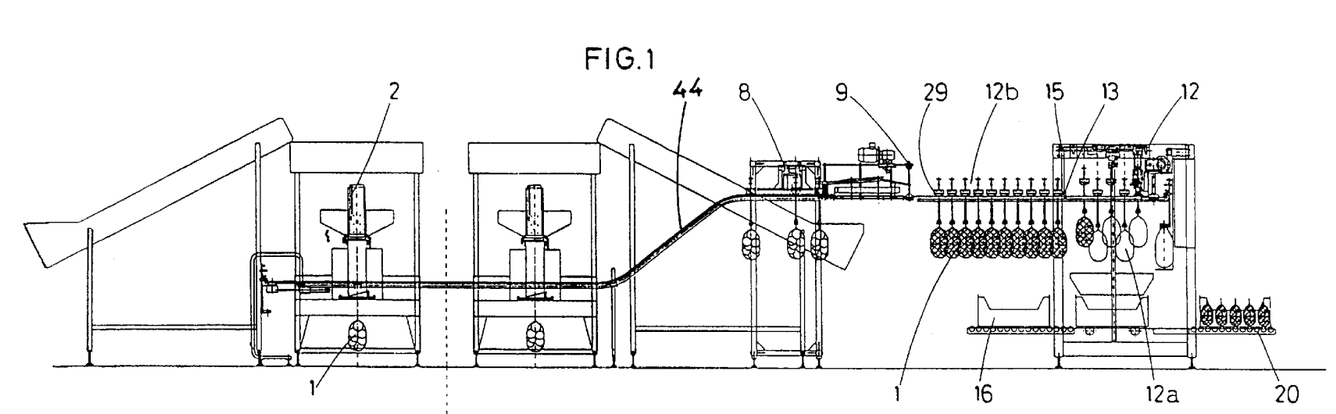
FIG. 1 is a longitudinal elevation view of the whole machine.
Figure 2:
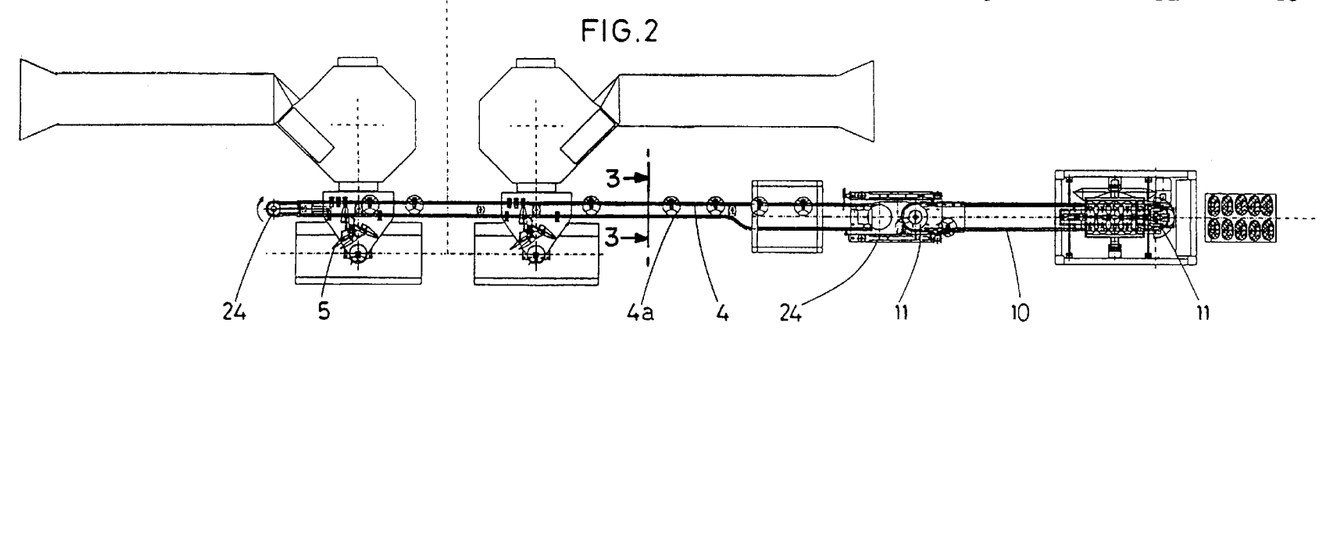
FIG. 2 is a plan view of the whole machine.
Figures 3, 4:
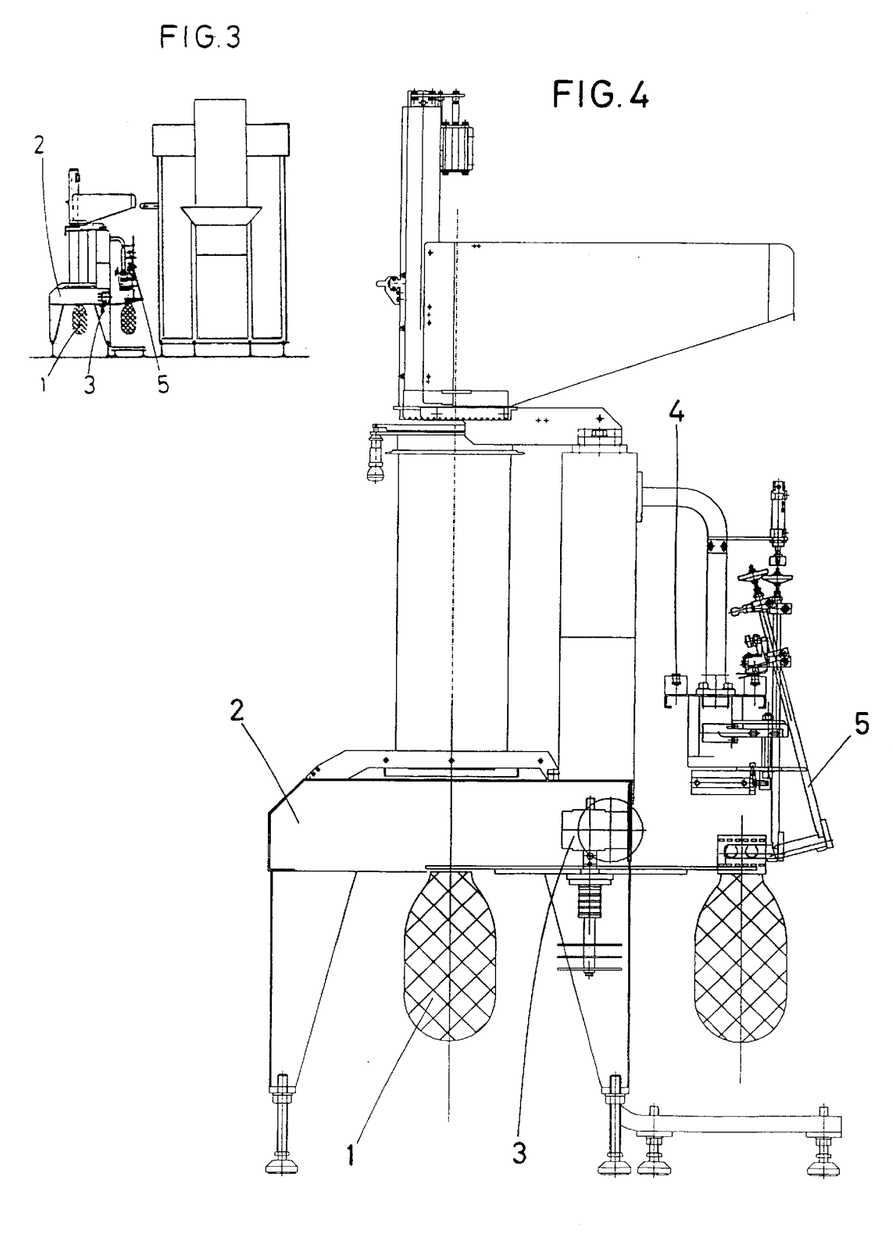
FIG. 3 is a side view along 3-3 of FIG. 2.
FIG. 4 is a side view of the bagger with the removing element.
Figure 5:
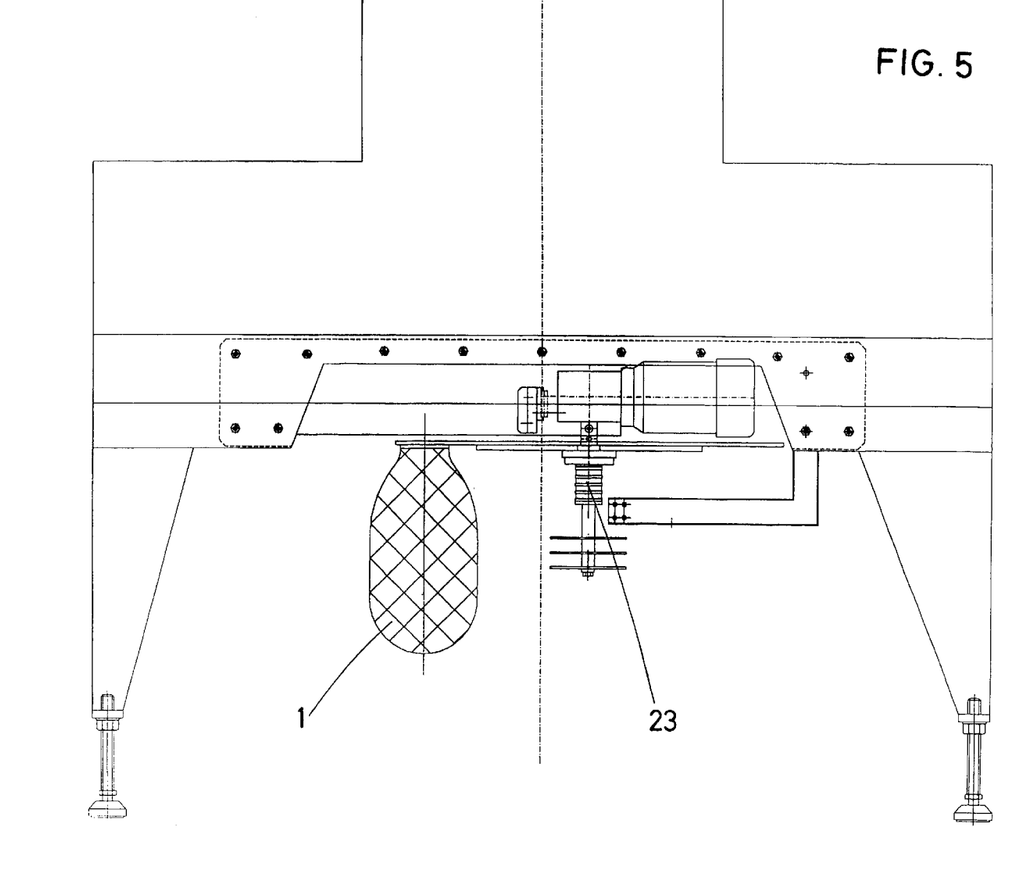
FIG. 5 is a rear view of the removing element.
Figure 6:
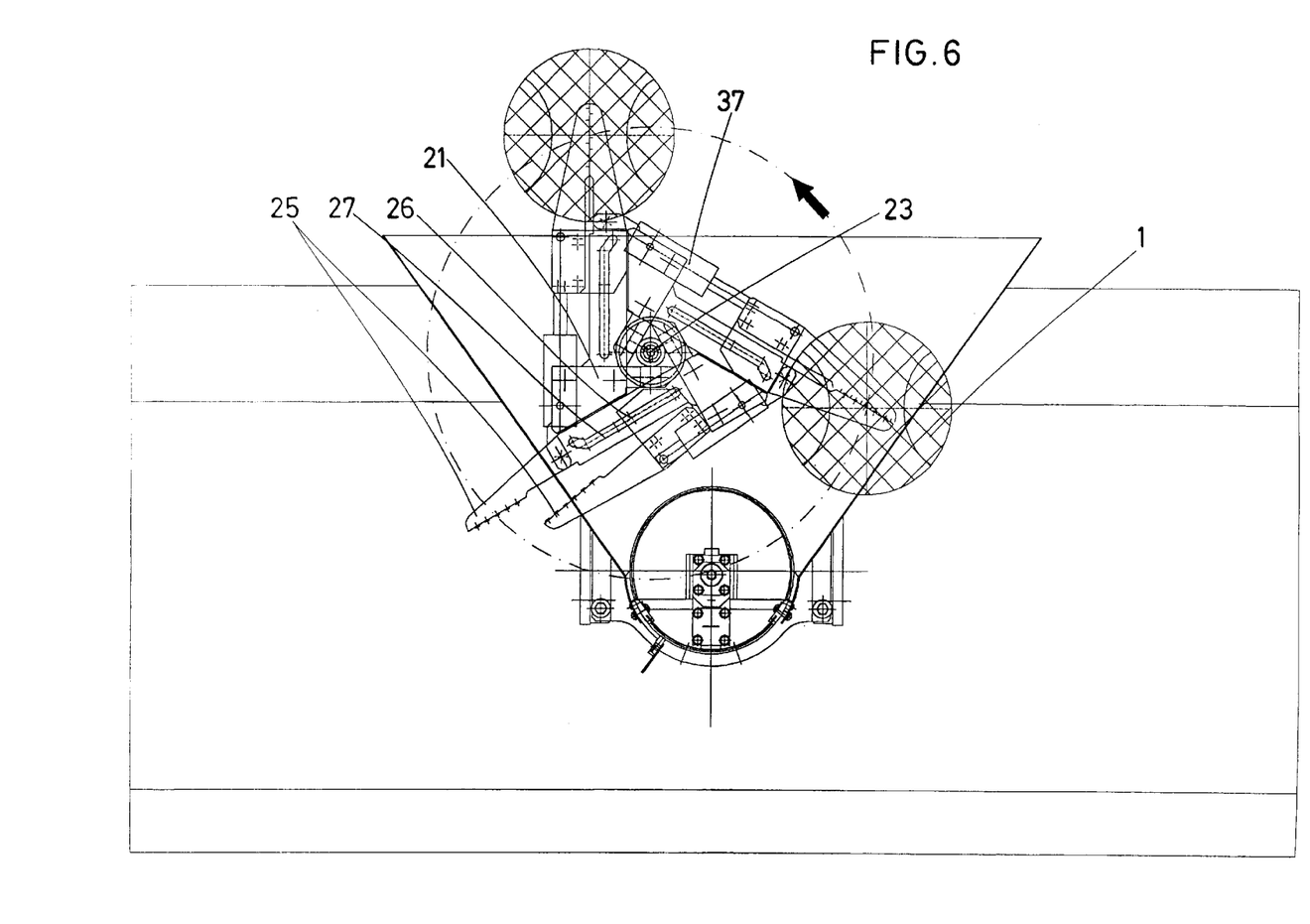
FIG. 6 is a plan view of the removing element.

Each clamp -21- comprises two press fingers -25- for holding the bags -1- either through their laminar fringe or through the end of the mesh of said closed bags. The said press fingers -25- are articulated at -26-, toward end closed and open positions, acted by means of a cam -27- that slides between each pair of fingers, said cam being impelled by a pneumatic cylinder -37-.

Each clamp -21- has a longitudinal movement in sync with the movements aforesaid, to define a forward position of the clamp with its fingers in the pressed position, and a retracted position of the other clamp, with the fingers in the open position, in order to collect bags -1- from the bagging machine -2- and release them to the grippers -5- of the conveyor line -4-.

The grippers -5- (FIG. 7) consist of a tubular rod -28- having an intermediate slide -29- supported on and driven by the chain -4- pivots -6- of the first conveyor line, and subsequently by the chain -10- of the second conveyor line. The rod -28- is provided with an axial stem -30- having an actuation head -31- and a cam -32- located at its bottom end which drives press fingers -33- toward a position pressing the flap or end of the bag.

Figure 7:
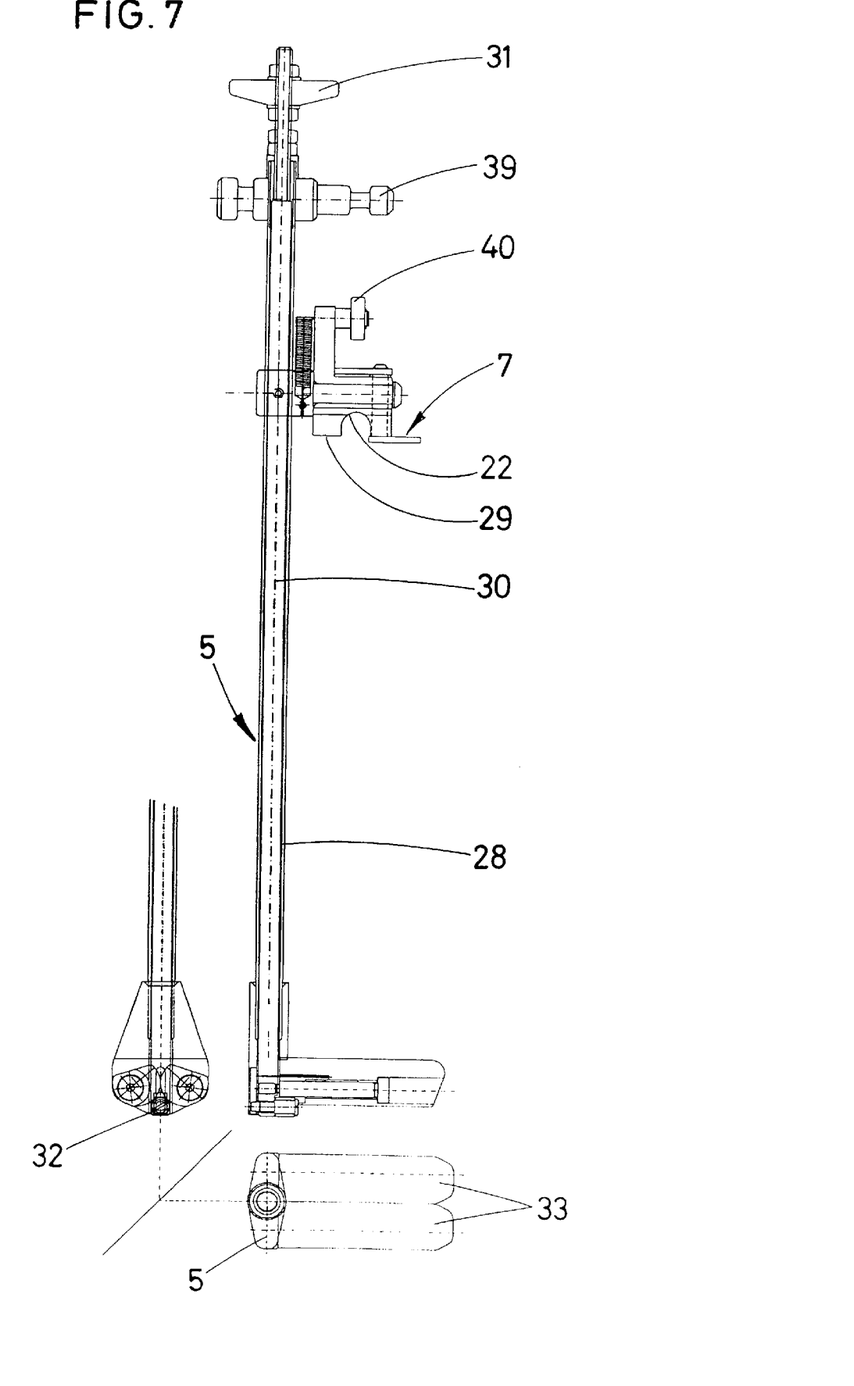
FIG. 7 is a detail of the conveyor grippers.

The gripper -5- slide -29- contains said mechanical drive means -22- which relate it to the chain -4- pivots -6-, allowing it to travel due to pressure. The slide -29- also contains the drive means -7- that relate the grippers -5- to the chain -4- due to traction when such grippers -51- mustbe lifted or lowered to different heights along the inclined sectors -44- and are lifted from said chain -4-, due to the presence of a track -34- located at the weight control area, to be effected by the weighing machine -8-. When the gripper -5- is lifted, it slides on the track -34- by means of bearings -40-. The drive means -7- that relate the grippers -5- to the chain -4- due to traction are locked by an element -46- and unflocked by an element -47-, which may be located anywhere in the installation, as required.

The track -34- (FIG. 13) lying above and horizontal to the chain -4- has inclined plane ends, -34a- and -34b-, which are accessed by the slide -29- of the gripper -5-, which is released from the friction drive means -22-, the drive means -7- being exclusively operative through traction in order to optimise weighing of the relevant bag.

The gripper -5- and bag -1- transfer means between conveyor lines -4- and -10- (FIGS. 10 and 11) comprise an articulated arm -35-, that may be raised in a vertical plane, that takes the gripper -5- slide -29- and positions it at the top end of an inclined track -36- by means of the pivot -39-. This track -36- is arranged between said arm and the other conveyor line -10-.

The transfer means -9- (FIG. 12) pass the gripper -5- from the chain -4- to the chain -10- by means of an auxiliary chain -41-, that is provided with pins -42- that drive the gripper -5- along the track -35–36-.

Figure 12:
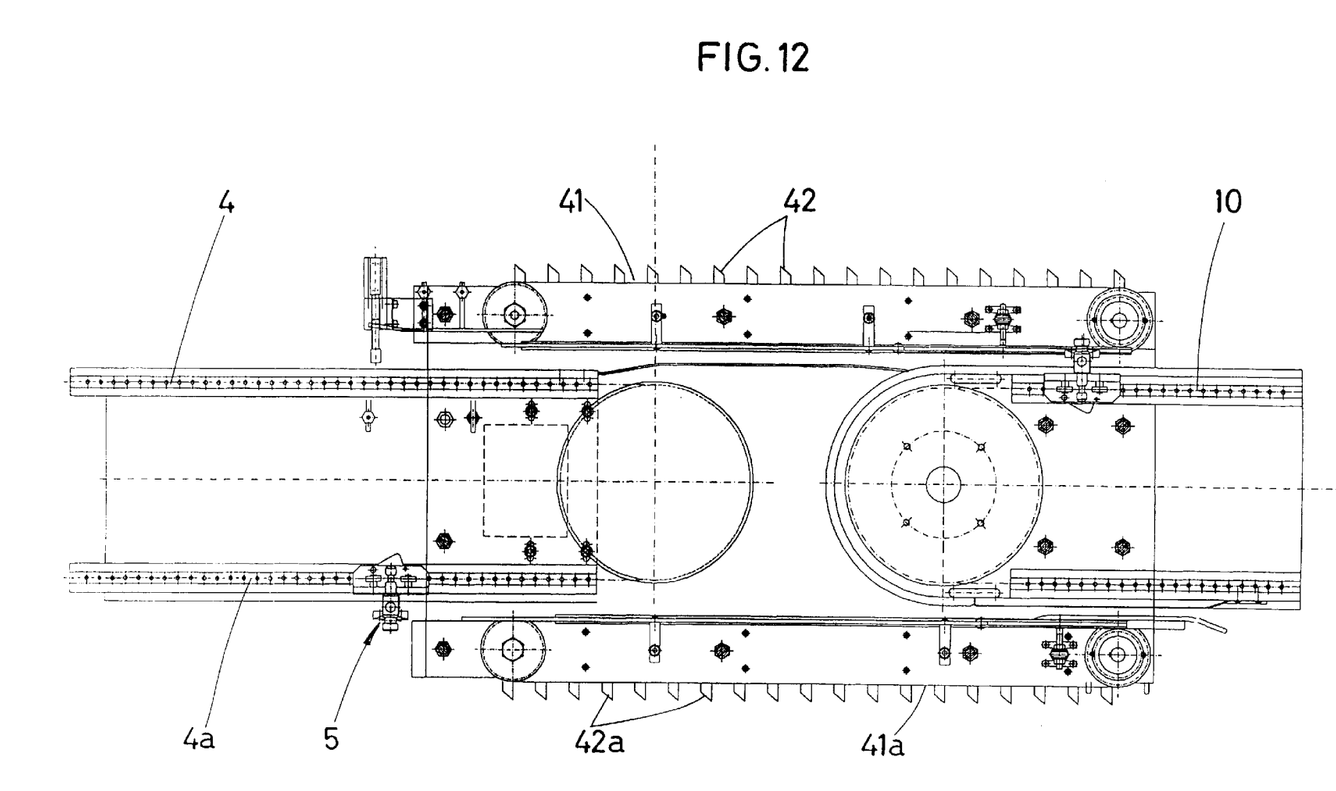
FIG. 12 is a plan view of the full and empty gripper selector.

The return of the empty grippers from the chain -10- to the chain -4a- takes place by means of an auxiliary chain -41a- and pins -42a-.

A first objective of the invention is process automation, requiring no manual involvement, with the resulting economic and functional advantages derived from this.

A second objective of the invention is to successfully fit full bags with a minimum weight tolerance.

A third objective of the invention is to obtain an orderly arrangement of the bags in their container, or in the case of mesh or closed bags, with the labels or advertising and identifying elements further pointing in a similar direction to improve their presentation.

A fourth objective is to successfully make the most, with this new programmable pre-fitting grouping system, of the space available within the box without the product projecting therefrom.

I claim:

1. A process for continuously fitting mesh bags containing fruit and vegetable products and a machine to carry out said process, comprising means (3) to remove full mesh bags (1) produced by at least a bagging machine (2) and transferring said full mesh bags to a first conveyor line consisting of an endless chain (4), arranged between vertical axis pulleys (24), and gripping means (5) that collect bags (1) removed from said at least bagging machine (2), which gripping means (5) and the collected bags (1) are driven by said endless chain (4); in that said gripping means (5) carry bags (1) include mechanical means (22,7) driving the same such that said gripping means (5) may travel due to pressure or due to traction; in that said first conveyor line includes inclined sectors (44) along its line of travel for said gripping means (5) to be lifted and lowered, and weight control means (8) continuously measuring the weight of the bags (1) suspended from the gripping means (5) by issuing a weighing machine; printed bar-code scanning and reading means (48) and said full mesh bag (1) verifying means (38); in that transfer means (9) are provided at the end of the first conveyor line (4) which depending on an order/signal given by the weight control means (8) and said verifying means (38) and scanning and reading means (48), establish a mechanical connection with a second conveyor line (10) that conveys the gripping means (5) and bags toward a bag fitting station (12) or provides a discontinuity between both conveyor lines (4,10), which results in the bags (1) that are rejected or gripping means (5) without bags being recovered through a return branch (4a) of the first conveyor line; (4) and in that the bag fitting station (12) includes first means (43) that collect said gripping means (5) and bags, taking them from the endless chain; second means (14) that suspend said gripping means (5) and bags at different heights; third means (15) that group said gripping means (5) and bags, compacting them in a downward vertical movement of said third means (15) with respect to a box (16); fourth means (17) that lift said box toward the group to be fitted; and fifth means (18) that vibrate the box full of bags, which are released thereupon from the gripping means (5), which continue along their way.

2. A machine as in claim 1 wherein said means (3) for removing said full mesh bags (1) produced at the bagging machine (2) comprises at least two clamps (21) each of which is made up by a parallel structure lying on the same horizontal plane and connected to a common shaft (23), standing upright intermediate the clamps having an axial turning movement which allows said clamps to be respectively positioned for removal of said bags (1) and for delivery of said bags (1) to the gripping means (5) of said first conveyor line.

3. A machine according to any one of claim 1 or 2, characterized in that each clamp (21) consists of two fingers (25) for pressing the laminar fringe of the bag or closed meshes and bags, articulated toward end closed and open end positions, being driven by a cam (27) which slides between both fingers (25), and being impelled by mechanical and/or pneumatic means (37), located at the bag collection and dropping points, each clamp (21) having a longitudinal movement in sync with the aforesaid movements, to define a forward position of the clamp (21) and a pressed position of the fingers (25), and a retracted position of the clamp and an open position of said fingers.

4. A machine as in claim 2, wherein said horizontal plane on which the fingers (25) pressing the clamps (21) are operated, lies at a height beneath the plane on which the bagging machine (2) cutting means are operated.

5. A machine as in claim 1, characterized in that the gripping means (5) of the conveyor line (4) comprises a tubular rod (28) provided at generally its middle area with a slide (29) supported on and driven by said endless chain (4) making up said first conveyor line, and said tubular rod includes an axial stem (30) provided with a projecting pulsing head (31), and a localized action cam (32) at its bottom end, driving two press fingers (33) toward a position at which the flap or end of the bag is pressed.

6. A machine according to any one of claims 1 or 5, characterized in that said gripping means (5)/slide (29) of said first conveyor line has mechanical pressure drive means (22) related to pivots (6), being an extension axial of pins that connect (4) said endless chain; weight control travelling bearings (40); and mechanical traction elements (7), locked by elements (46) and unlocked by elements (47).

7. A machine as in, claim 5 characterized in that the continuous bag (1) weight control means (8) consist of a horizontal track section (34) lying above, said first conveyor which track has inclined plane ends (34a) accessed by said gripping means (5)/slide (29), which is freed from the friction with said endless chain, being driven thereby exclusively by the mechanical traction elements (7) in order to optimise weighting of the relevant bag.

8. A machine as claim 5 characterized in that said transfer means (9) transferring said gripping means (5) and said bags between the transport lines (4) and (10) consist of an articulated arm (35) which holds a static upwardly inclined position toward a horizontal arm (36), provided with a downwardly inclined end (36a) altogether establishing a guide for pivot (39) of said gripping means (5), which is axially lifted and detached from said endless chain (4), said gripping means (5) being exclusively driven by pins (42) of auxiliary chains (41) which drive said tubular rod (28) until said gripping means (5) is located on the inclined plane (36a) connecting with said second conveyor line (10).

9. A machine as in claim 8, characterized in that when the weight control means (8) detects gripping means (5) with unsuitable bags and empty, gripping means an order/signal is given thereby activating said articulated arm (35), which is upwardly articulated on a vertical plane enabling said gripping means (5) to travel below the guide made up by the arm (35), (36), and (36a), driven by said endless chain (4), in order to be rejected along the return branch (4a), with means (45) located at any point of such branch to operate a head (31) driving said gripping means (5), causing said press fingers (33) to be articulately opened, releasing the unsuitable bag (1).

10. A machine as in claim 1, characterized in that said bag fitting station (12) has a fitting section (12a) and a pre-fitting section (12b) at which bags are held back by stop means (13) which prevents bag access into the fitting section (12a) at which first pneumatic cylinders (43) collect said gripping means and bags, withdrawing them from said endless chain (4); second pneumatic cylinders (14) suspend said gripping means and bags at different heights; and third pneumatic cylinders (15) group said gripping means said bags, compacting the suspended group of bags in the vertical projection of said box (16) supplied by conventional box feeding means from which means said box is lifted by means of a platform-lift (17) up to a suitable height to house the group of bags (1) within it vibrating means (18) and means (19) releasing the bags from their respective gripping means (5) being operated, and the platform being lowered to the height of conveyor means which remove a box (16) full of bags from sub-bag fitting station (12).

* * * * *